Patented May 11, 1943

2,318,733

UNITED STATES PATENT OFFICE 2,318,733

PLANT TREATMENT COMPOSITION

George S. Avery, Jr., New London, Conn., assignor to The Dow Chemical Company, Midland, Mich., a corporation of Michigan No Drawing. Application January 18, 1941, Serial No. 375,017

11 Claims. (Cl. 47—58)

This invention relates to plant treatment compositions and is particularly concerned with mixtures having both plant growth control and parasiticidal properties and adapted to be applied to the aerial portion of plants. The present application is a continuation-in-part of co-pending applications Serial No. 104,542, filed October 7, 1936, and Serial No. 120,449, filed January 13, 1937.

Compounds such as indyl-acetic acid, alpha-naphthyl-acetic acid, and alpha-naphthyl-acetamide have been recognized as having a regulating effect upon certain phases of plant growth and development, and are widely employed as active constituents of orchard sprays designed to control abscission layer formation and subsequent fruit drop. Other uses for which these compounds have been applied are in connection with the stimulation of fruit development and the artificial fertilization of flowers to produce seedless fruits. These compounds have been indefinitely classified as "plant auxins" or "plant hormones" along with all naturally occurring and synethetic products, including ethylene and ammonia, which exert any stimulating effect whatever upon plant growth. The naphthyl and indyl aliphatic acids and acidamide derivatives, however, are not the equivalent of such naturally occurring materials as Auxin A, Auxin B, and auxin-containing extracts of plant and animal material. An important point of differentiation resides in the fact that such naturally occurring materials are almost invariably mixtures comprising substantial amounts of growth inhibiting substances, so that the effect of such mixture upon the plant may be detrimental rather than desirable. Furthermore, such naturally occurring products are (1) expensive because of the involved processes required for their separation, (2) relatively unstable to acids, alkalies, and light, and (3) of indefinite purity and auxin content, so that their effectiveness in a given composition is not readily ascertained or predicted.

The application of such parasiticides as lead arsenate, sulfur, bordeaux mixture, and the like, to plants, and particularly fruit trees late in the growing season has become standard practice. Lead arsenate is now frequently applied to apples for the control of coddling moth up to and through the time of harvest. Likewise sulfur applications are made to fruit trees for the control of "pinpoint" scab on the fruit and leaves late in the growing season and up to the time of normal tree defoliation. Bordeaux mixture and similar copper sprays are applied to cherries for the control of "shot hole" fungus both prior to and after harvest so as to prevent the uncontrolled spread of the fungous disease and resultant denuding of the affected trees.

I have discovered that in the application of plant treatment materials, it is frequently advantageous to combine in a single treating composition a synthetic plant auxin and an insecticide or fungicide such as lead arsenate, sulfur, or Bordeaux mixture. By operating in this manner plant treatment costs are materially reduced and the desired effects of both the parasiticides and synthetic auxin are simultaneously obtained. Mixtures of synthetic auxins with such an insecticide or fungicide may be advantageously incorporated into either spray or dust materials for the treatment of the aerial portion of plants. It has further been found that the desirable properties of such compositions are not just the sum of the properties of their constituents, but that new and unpredictable results are thereby obtained.

The term "synthetic auxin" as herein employed refers to chemically pure organic compounds, particularly acids and acidamides, capable of causing an enlargement of the plant cell, as distinguished from those substances that influence plant growth by supplying nutrient to the plant. The class of "synthetic auxins" includes indyl-acetic acid, indyl-propionic acid, indyl-butyric acid, alpha-naphthyl-acetic acid, alpha-naphthyl-propionic acid, phenyl-acetic acid, fluorene-acetic acid, anthracene-acetic acid, the esters and salts of such acids, alpha-naphthyl-acetamide, alpha-naphthyl-propionamide, and indyl-acetamide, all of which are readily prepared according to known methods of organic synthesis. The term does not include inorganic stimulants, Auxin A, Auxin B, or substances such as ammonia and ethylene which have undesirable volatility. Each of the compounds included within the class contains an indole, benzene, naphthalene, anthracene, or fluorene ring structure and is characterized by having plant hormone-like properties.

The expression "aerial portion of plants" as herein employed refers to the stem, leaf, flower, and fruit of the plant. The expression is comparable to the term "shoot" in distinction to "root," except that where "shoot" is most frequently employed to designate a sprout or tender green growth from a seed or bulb, it is the intent of the present expression to include the trunk, branches, stem, leaves, flowers, and fruit of trees as well.

In carrying out the invention a suitable paraasiticide is mixed with a synthetic auxin to obtain the desired composition. This mixing may be carried out in any suitable manner. For example, the parasiticide and synthetic auxin, both in chemically pure form, may be mixed or ground together to form a concentrate adapted to be incorporated in standard dust or spray compositions for application to plants. In this embodiment of the invention the proportions of materials employed varies with the form and manner in which the diluted concentrate is to be subsequently employed. When the concentrate is to be incorporated into a spray, the proportions of constituents in the concentrate are so adjusted that at the preferred concentration of the parasiticidal toxicant the synthetic auxin will be present in the dilute composition to form 2 to 40 parts per million and preferably between 5 and 15 parts per million. When the concentrate is to be substantially incorporated into a dust the amount of synthetic auxin employed is such as to provide from 10 to 1000 parts per million and preferably from 50 to 250 parts per million in the finished composition. The exact limits observed in each instance are dependent upon the tolerance of the plant to be treated.

In preparing concentrates as outlined above the mixture of parasiticidal toxicant and synthetic auxin may be modified with any suitable carrier, or with such organic toxicant as may be desired. For example, the two major ingredients may be ground or otherwise dispersed in or on a solid carrier such as bentonite, diatomaceous earth, gypsum, talc, wood flour, volcanic ash, or any mixture of one or more of such finely-divided inerts to obtain the concentrate in the form of a dust or powder. In further modifications, the synthetic auxin and parasiticide may be ground with water or other non-solvent to form a paste concentrate, or so processed as to form an emulsion containing high concentrations of each ingredient.

In any of the foregoing situations, such wetting, dispersing, and emulsifying agents as sodium lauryl sulfate, sulfonated oils, sodium and potassium salts of sulfonated oils, salts of sulfonated phenols, salts of sulfonated benzene and naphthalene, soaps, alkanolamines, sulfite pulping waste, caseinates, glyceryl esters, long chain fatty acids, etc., may be employed as expedient, provided only that such added ingredient not be so reactive with the synthetic auxin or parasiticide as to limit the effectiveness of the composition.

The concentrates as prepared above are subsequently diluted with finely divided solids or suitable liquid carriers to obtain dusts, aqueous dispersions, or emulsions adapted to be employed for the treatment of the aerial portion of growing plants substantially as hereinafter set forth.

In an alternate procedure the parasiticide may be dispersed in a dilute spray or dust composition comprising the preferred amount of the synthetic auxin. Similarly, the required amount of synthetic auxin may be added to spray or dust comprising the parasiticide to obtain compositions falling within the scope of the present invention.

Regardless of whether the ultimate plant treatment material is prepared by dilution of a concentrate or by addition of one or both of the principal ingredients to a previously prepared dilute composition, the results obtained upon application of the mixture to plant life and parasites are the same. It has been found that the synthetic auxin frequently serves as an activator for the parasiticide, whereby a greater than additive kill of pests is obtained. In addition to this result, the parasiticide cooperates with the synthetic auxin to materially increase the effectiveness of the latter in controlling the formation of abscission layer, as for example, in preventing fruit drop. The application of the parasiticide alone to fruit laden trees does not prevent premature dropping, but may accelerate the abscission of the fruit. In view of the diverse character of the parasiticides which have been found to cooperate with the synthetic auxins, no limiting explanation or theory is presented for the phenomena as observed.

The following examples illustrate the invention but are not to be construed as limiting the same.

*Example 1*

Alpha-naphthyl-acetic acid was dissolved in water in the amount of 10 parts per million to form a spray material adapted to be applied to the aerial portions of trees to control the formation of abscission layer and thereby prevent the premature fall of fruit. This composition was applied to MacIntosh apple trees immediately prior to the normal harvesting time of the apples. The average fruit drop shown by trees sprayed with this composition was 3.24 per cent.

99.67 parts by weight of acid lead arsenate was intimately ground with 0.33 part of sodium alpha-naphthyl-acetate to form a plant treatment concentrate. 342 grams of this composition was dispersed in 25 gallons of water and applied to MacIntosh apple trees over the same period as the foregoing application with the alpha-naphthyl-acetic acid alone. At the end of 7 days a total of 21 apples out of 738 had fallen from the trees for a percentage drop of 2.85. This was 88 per cent of the drop obtained when alpha-naphthyl-acetic acid alone was employed. No injury to either foliage or fruit was observed. The application of acid lead arsenate alone had no apparent effect upon the rate of drop of apples.

*Example 2*

94.2 parts by weight of finely divided sulfur, 5.0 parts of diatomaceous earth, 0.8 part of 2.4-dinitro-6-cyclohexyl-phenol, and 0.22 part of alpha-naphthyl-acetic acid were similarly ground together to form a fungicide concentrate. A spray consisting of 455 grams of this composition in 25 gallons of water was applied to MacIntosh apple trees shortly before normal harvesting time and the trees observed for the same period over which the trees sprayed with alpha-naphthyl-acetic acid alone were observed. Of the 584 apples originally present on the tree, only 8 had fallen after 7 days for a drop of 1.37 per cent. This was 42.4 per cent of the drop obtained when alpha-naphthyl-acetic acid alone was employed. No injury to fruit or foliage was observed as a result of the application of this spray composition. When the sulfur composition alone was applied to the tree at a comparable dilution, no effect upon the rate of drop of apples was observed.

*Example 3*

Other compositions which may be similarly employed to obtain comparable results include the following:

Composition A: Parts by weight
Lime sulfur (32–33° Bé.) _____ 99.92
Alpha-naphthyl-acetic acid _____ 0.08

This concentrate may be applied at the rate of 1500 grams per 25 gallons of water.

Composition B: Parts by weight
Sulfur _____ 97.78
Alpha-naphthyl-acetic acid_____ 0.22
Sodium lauryl-sulfate_____ 2.0

This composition may be applied at the rate of 455 grams dispersed in each 25 gallons of water.

Composition C: Parts by weight
Bordeaux mixture_____ 99.78
Alpha-naphthyl acetamide_____ 0.22

This composition may be applied at the rate of 455 grams in each 25 gallons of water.

Composition D: Parts by weight
Acid lead arsenate_____ 99.67
Indyl-acetic acid _____ 0.33

This composition may be applied at the rate of 342 grams in each 25 gallons of water.

Other fungicidal and insecticidal toxicants which may be compounded with the synthetic auxins substantially as described in the foregoing examples are metallic arsenates and arsenites such as the derivatives of lead, calcium, magnesium and copper; and inorganic copper compounds such as copper hydrate, copper hydroxide, copper carbonate, basic copper arsenite, copper acetate, and the like.

A copending application Serial No. 371,827, filed December 26, 1940, is particularly concerned with parasiticidal mixtures comprising the synthetic plant auxins and organic toxicants.

Other modes of applying the principle of my invention may be employed instead of those explained, change being made as regards the materials employed, provided the products described in the following claims be thereby obtained.

I therefore particularly point out and distinctly claim as my invention:

1. A composition of matter for application to the aerial portion of living plants including a relatively small amount of a synthetic auxin and a parasiticide selected from the class consisting of sulfur, lime sulfur, metallic arsenates and arsenites, and inorganic copper compounds.

2. A spray composition for application to the aerial portion of living plants including from 2 to 40 parts per million of a synthetic plant auxin and a parasiticide selected from the class consisting of sulfur, lime sulfur, metallic arsenates and arsenites, and inorganic copper compounds.

3. A dust composition for application to the aerial portion of living plants, including from 10 to 1000 parts per million of a synthetic auxin and a parasiticide selected from the class consisting of sulfur, lime sulfur, metallic arsenates and arsenites, and inorganic copper compounds.

4. A plant treatment composition for application to the aerial portion of living plants including alpha-naphthyl-acetic acid and a parasiticide selected from the class consisting of sulfur, lime sulfur, metallic arsenates and arsenites, and inorganic copper compounds.

5. A composition of matter for application to the aerial portion of living plants including a relatively small amount of indyl-acetic acid and a parasiticide selected from the class consisting of sulfur, lime sulfur, metallic arsenates and arsenites, and inorganic copper compounds.

6. A plant treatment composition for application to the aerial portion of living plants including a synthetic auxin and finely divided sulfur.

7. A plant treatment composition for application to the aerial portion of living plants including a synthetic auxin and lead arsenate.

8. A plant treatment composition for application to the aerial portion of living plants including a synthetic auxin and Bordeaux mixture.

9. A plant treatment composition for application to the aerial portion of living plants including alpha-naphthyl-acetic acid and lead arsenate.

10. A method for simultaneously controlling plant parasites and regulating plant growth which comprises applying to the aerial portion of the plant a composition comprising a synthetic plant auxin and a parasiticide selected from the class consisting of sulfur, lime sulfur, metallic arsenates and arsenites, and inorganic copper compounds.

11. A method for simultaneously controlling plant parasites and regulating plant growth which comprises applying to the aerial portion of the plant a composition comprising alpha-naphthyl-acetic acid and a parasiticide selected from the class consisting of sulfur, lime sulfur, metallic arsenates and arsenites, and inorganic copper compounds.

GEORGE S. AVERY, Jr.